United States Patent Office 2,807,786
Patented Sept. 24, 1957

2,807,786

SURFACE WAVE TRANSMISSION LINE ELEMENT

Bernard Pierre Chiron, Paris, France, assignor to Lignes Telegraphiques & Telephoniques, Paris, France Application April 26, 1954, Serial No. 425,654

Claims priority, application France May 21, 1953

4 Claims. (Cl. 333—97)

The present invention relates to surface wave transmission lines consisting of a cylindrical conductor covered with a layer of dielectric material.

It is known that when a surface wave transmission line is bent at a radius of curvature R, the attenuation of this line is greatly increased. This increase is due, particularly, to a radiation loss and it may reach a value of several decibels with curvature radii of the order of 10 centimeters, at a frequency of 10,000 mc./s.

It is an object of the present invention to provide, in a line of this nature, a bend with substantially no attenuation or reflection. This bend is effected by means of a pulley made of dielectric material with very low losses, on which the line is bent to the desired curvature radius and the material, geometrical shape and dimensions of which are so selected that the bend is obtained without any noticeable attenuation or reflection.

The invention will be described in greater detail with reference to the appended drawing, wherein:

Figure 1 represents, in longitudinal section and Figure 2 in transverse section, a surface wave transmission line constituted by a cylindrical conductor 1 with a circular cross section of radius $a$ covered with a layer 2 of dielectric material of a thickness $b$.

Figure 1:
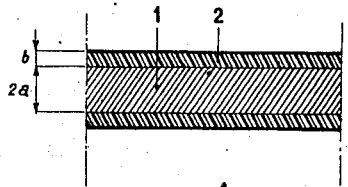
Figures 1 and 2 represent axial and transverse sections through a surface wave transmission line.
Figure 2:
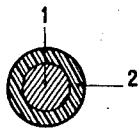
Figure 3:
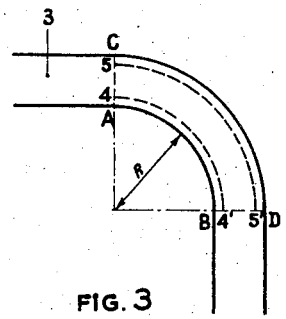
Figure 3 represents a plan view of a surface wave transmission line bent to 90° with a radius of curvature R.

Figure 3 represents a surface wave transmission line 3, constituted like the one shown in Figures 1 and 2, and bent to 90° with a radius of curvature R as indicated in Figure 3. The radiation caused by a bend in a surface wave transmission line can be explained by the fact that the phase shifts introduced between the points in the two extreme sections AC and BD of the bend and located on any two curvature lines, such as 4, 4' and 5, 5' are different.

Considering, for example, the phase shifts along the two extreme curvature lines AB and CD, the phase shift between B and A is $$\frac{2\pi l}{\lambda}$$

and the phase shift between D and C is $$\frac{2\pi L}{\lambda}$$

designating by $l$ the length AB
L the length CD
$\lambda$ the phase wave length of the line when not bent Considering, as a further approximation, the waves as propagating in air, and since L is larger than $l$, these phase shifts can be made equal only by decreasing the wave length along AB. Placing, for instance, a dielectric mass, in the angle of the bend, the new propagation wave length $\lambda_m$ along AB may be written, neglecting the losses in the dielectric mass:

$$\lambda_m = \frac{\lambda}{\sqrt{\epsilon}}$$

$\epsilon$ being the permittivity with respect to air of the dielectric material used.

The disturbances introduced by a bend will therefore be minimum when $$\frac{2\pi l}{\lambda_m} \text{along AB} = \frac{2\pi L}{\lambda} \text{along CD}$$

i. e. with a dielectric mass placed in the angle of the bend:

$$\frac{2\pi l\sqrt{\epsilon}}{\lambda} = \frac{2\pi L}{\lambda} \text{ or } l\sqrt{\epsilon} = L \quad (1)$$

The value of $\epsilon$ obtained from Equation 1 as a function of a diameter of the line used and of the radius of curvature R is only an approximate one, since it takes into account only the phase shift between the two lines of extreme curvatures CD and AB, but it can be derived from this equation that the value to be given to $\epsilon$ should increase when the radius of curvature R of the bend decreases. As a first approximation, for radii of curvature close to 100 mm. it is sufficient to give $\epsilon$ a value close to that of the permittivity of the dielectric covering the wire.

Experimental investigations were made with conductors consisting of copper wires covered with polyethylene and using dielectric masses of polystyrol the electric characteristics of which are substantially close to those of polyethylene.

The above reasoning, though not strict, makes it possible however to show the possibility, by using a low loss dielectric mass placed in the angle of the bend, of passing around the bend without any noticeable disturbance.

In practice, the dielectric mass is used in the shape of a cylindrical pulley in which a groove has been cut and the radius of which is equal to the radius of curvature R of the bend, increased by the depth of the groove.

Figure 4:
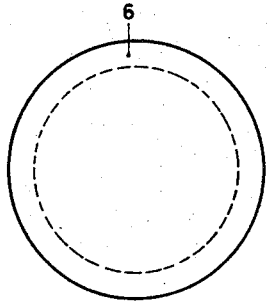
Figures 4 and 5 represent a plan view and an end view of a type of pulley according to the invention.
Figure 5:
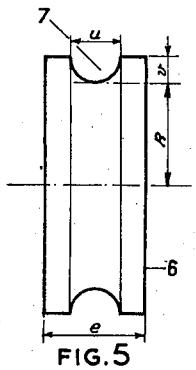

Figures 4 and 5 represent such a cylindrical pulley 6 in which a groove 7 has been cut.

The thickness $e$ of the pulley should be sufficient to eliminate the radiation effect caused by the bend, but it should also be low enough not to disturb the propagation of the field guided around the line. It was found experimentally that very good results are obtained by taking a thickness $e$ equal to twice the diameter of the line used.

The groove of the pulley is intended to guide the line around the dielectric mass and to ensure a very good contact between said dielectric mass and the line. The width $u$ of the groove is taken as twice the radius of the line and its depth $v$, equal to the radius of the line.

Figure 6:
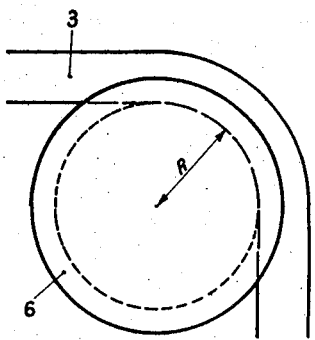
Figure 6 represents a plan view of a surface wave transmission line bent around a pulley.

In Figure 6, the surface wave transmission line is shown bent around a pulley 6 similar to that shown in Figures 4 and 5.

The following example makes it possible to estimate the dimensions of a pulley made in accordance with the invention and the results obtainable. At a frequency of 3150 mc./s., in a 40 meters long surface wave transmission line consisting of a copper conductor with a diameter $2a=2.5$ mm. and covered with a layer of polyethylene having a thickness $b$ equals 1.25 mm. and bent around a polystyrol pulley having a radius of 100 mm., 10 mm. thick and a groove 5 mm. wide and 2.5 mm. deep, the measured attenuation for the assembly is 3.87 db. while the attenuation of the same assembly but with no pulley is 5.95 db. and the attenuation in a straight line, therefore with no bend or pulley, is 3.9 db.

The example of a cylindrical pulley given above is not limiting in any way, but the latter has been specially studied as it is the most rational shape for the bends most frequently encountered in practice, i. e. for bends in the shape of circular arcs the radii of which can vary from 50 to 200 mm.

Figure 7:
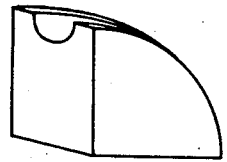
Figure 7 represents a perspective view of another type of pulley.

Within the scope of the invention, the dielectric mass to be placed at the angle of the bend may be given any shape, provided said mass has a very good contact with the bend all along the curved portion. Figure 7 shows a pulley cut in the shape of a circular quadrant; the results obtained with this type of pulley are as satisfactory as with a complete cylindrical pulley.

Figure 8:
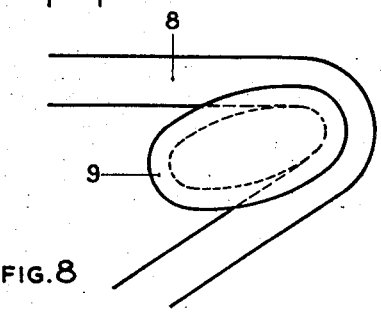
Figure 8 represents a plan view of a bent portion in a line curved with a hair-pin bend.

Figure 8 gives an example of a bend in the case of a line 8 curved in "hair-pin" fashion. The dielectric mass 9 has, here, such a shape that its cross section is approximately an ellipse.

By way of other non-limiting examples of application of the invention, the use may be mentioned of pulleys in the setting up of magic T's, directional coupling elements, etc., for surface wave transmission lines.

I claim:

1. In a surface wave transmission line consisting of a metal conductor covered with a dielectric layer of uniform thickness and curved in a bend, a device allowing transmission with reduced atenuation and reflection coefficient along said line, comprising a pulley of dielectric material provided on its external cylindrical surface with a U-shaped groove in contact with the outer surface of said line inside said bend and extending up to the center of curvature of said bend, said pulley having a thickness substantially equal to twice the outer diameter of said transmission line.

2. A device as claimed in claim 1, wherein the permittivity of said dielectric material is substantially equal to that of said dielectric layer.

3. A device as claimed in claim 1, applicable in the case of a bend in the shape of a circular arc, and comprising a circular pulley with a radius equal to that of said arc.

4. A device as claimed in claim 1, wherein said pulley is provided with a groove of semi-circular cross-section, said cross-section having a radius equal to half the diameter of said line.

References Cited in the file of this patent

UNITED STATES PATENTS

| 2,129,712 | Southworth | Sept. 13, 1938 |
| 2,723,378 | Clavier et al. | Nov. 8, 1955 |
| 2,737,632 | Grieg | Mar. 6, 1956 |

FOREIGN PATENTS

| 683,353 | Great Britain | Nov. 26, 1952 |

OTHER REFERENCES

"Journal of the British Institution of Radio Engineers," April 1953; pages 194–199.